United States Patent Office 3,052,704
Patented Sept. 4, 1962

3,052,704
POLYCYCLIC FUSED RING FERROUS GROUP
METAL COMPOUNDS
Richard E. Benson, Claymont, and John C. Thomas, Wilmington, Del., assignors to E. I. du Pont de Nemours and Company, Wilmington, Del., a corporation of Delaware
No Drawing. Filed June 15, 1953, Ser. No. 361,839
1 Claim. (Cl. 260—439)

This invention relates to new organometallic derivatives of group VIII metals and to their preparation. More particularly, this invention relates to new organometallic compounds of group VIII metals in which the metal is bonded directly to nuclear carbon of two separate polycyclic fused ring organic radicals and to methods for their preparation.

Organometallic compounds are of considerable interest for catalytic and synthetic applications. Organometallics such as tetraethyllead have achieved importance as antiknock agents for spark ignition engines. Some organometallics have been employed as catalysts in polymerization. Other organometallics such as hydrocarbo-lithium and hydrocarbo-sodium compounds are useful in synthetic organic chemistry.

Dicyclopentadienyliron and dicyclopentadienylnickel are relatively new organic compounds which are of considerable interest because in these compounds the metals are directly attached to a hydrocarbon radical. The iron compound is described and claimed by Pauson in U.S. patent application Serial No. 291,567, filed June 3, 1952, now U.S. Patent 2,680,756, issued June 8, 1954. The corresponding nickel compound is described and claimed by Thomas in U.S. patent application Serial No. 298,170, filed July 10, 1952, now U.S. Patent 2,680,758, issued June 8, 1954. The cobalt and ruthenium derivatives of cyclopentadiene have been reported by Wilkinson et al., J. Am. Chem. Soc. 75, 1953, 1011.

These organometallic compounds have been considered to have a unique molecular structure which has been called a molecular sandwich by various investigators, for example, Dunitz and Orgel, Nature, 171, 121, 122 (1953). The character of the cyclopentadiene system and the properties thereof have indicated to the investigators that each molecule must possess a center of symmetry to provide the stable compounds thus far obtained. This may account for the lack of success many investigators have had in previous efforts to obtain stable organo-iron, nickel and cobalt compounds. Such derivatives have been expected to be sensitive and unstable. Accordingly, it would be difficult to predict whether or not highly substituted cyclopentadienyl ring systems could be used in the preparation of organometallics or the properties of the resulting organometallics.

It is an object of this invention to provide new organometallic derivatives of group VIII metals and methods for their preparation. A further object is to provide new organometallic compounds of group VIII metals in which the metal is bonded directly to nuclear carbon of two separate polycyclic fused ring organic radicals and methods for their preparation. Other objects will appear hereinafter.

These and other objects of this invention are accomplished by providing new polycyclic fused ring organometallic compounds of group VIII metals in which the group VIII metal is bonded directly to nuclear carbon of two separate five-membered carbocyclic rings each having two ethylenic unsaturations and having fused thereto at least one further cyclic group with at least two nuclear carbons common to the five-membered carbocyclic ring. These new group VIII organometallic compounds have the grouping represented by the general formula R—M—R wherein M is a group VIII metal, preferably a ferrous group metal, i.e., iron, cobalt or nickel, and R is a polycyclic fused ring organic radical having a five-membered carbocyclic ring with two conjugated double bonds in the ring and from one to two fused rings each bonded to at least two nuclear carbons of said five-membered carbocyclic ring, said fused rings being preferably six-membered carbocyclic rings containing conjugated double bonds, the metal M being bonded directly to nuclear carbon of the five-membered carbocyclic rings. The grouping R—M—R is a monovalent cation when the valence of the metal M is 3. In preferred embodiments of this invention R is a five-membered carbocyclic group having two conjugated double bonds with from one to two benzo groups fused thereto, such as indenyl and fluorenyl.

In a preferred embodiment of this invention the group VIII organometallic compound is an organoiron compound in which the iron is bonded directly to nuclear carbon of two separate five-membered carbocyclic rings each having two ethylenic unsaturations and having fused thereto from one to two carbocyclic groups each with at least two nuclear carbons common to the five-membered carbocyclic ring. Thus, in this preferred embodiment of the invention, the organic radical is hydrocarbon and has two and not more than four of its nuclear carbons common to at least two rings of a polycyclic fused ring system.

The compounds of this invention can be obtained by the reaction of a Grignard reagent of the fused ring compound, preferably hydrocarbon, e.g., indene, with anhydrous group VIII metal halide such as ferric chloride.

The following example in which the parts are by weight further illustrates the practice of this invention.

EXAMPLE

*Preparation of Diindenyliron*

A four-necked flask was equipped with a dropping funnel, a thermometer, a sealed stirrer, and a condenser to which was attached a drying tube containing calcium chloride. Ethylmagnesium bromide was prepared in the usual manner from 4.9 parts of magnesium, 22.0 parts of ethyl bromide, and 110 parts anhydrous diethyl ether. The mixture was refluxed 0.6 hour after the addition of the ethyl bromide, 65 parts anhydrous toluene then added, and the temperature increased. The drying tube was removed from the condenser and the water drained to allow the ether to distill out of the reaction vessel. When the temperature of the flask contents reached 80° C. water was started through the condenser again and the condenser reassembled to tubing attached to a wet ice trap (to remove any remaining ether) and finally to a wet test meter.

A solution of 23.2 parts of indene in 75 parts of toluene was added to the Grignard reagent over 1.25 hours. Very little ethane appeared until the temperature reached 109° C. and at the end of 1.25 hours a volume of ethane corresponding to that of 3300 parts by weight of water was evolved. The mixture was refluxed for 2.2 hours longer, and a total volume of gas evolved corresponding to that occupied by 4480 parts by weight of water (theoretical gas evolution, 4900).

The olive green mixture was cooled to 20° C. and a solution of 10.8 parts of anhydrous ferric chloride in 110 parts anhydrous ether was added with cooling over 10 minutes at 20–25° C. The resulting bluish-black mixture was stirred at room temperature for one hour, then filtered and the insoluble material washed with ether several times. The insoluble material was largely inorganic. The filtrates were combined, flushed with nitrogen, and allowed to stand in a cold room overnight.

Two hundred parts of petroleum ether was added to the filtrate, the mixture cooled, and a reddish-brown solid removed by filtration (weight 12 parts). Two hundred parts of petroleum ether was again added to the filtrate to give 6.0 parts of brown solid. Two hundred fifty parts of petroleum ether was added to the latter filtrate and 3.2 parts of a grey solid was recovered by filtration. The final filtrate was concentrated to low volume by distillation at reduced pressure and a mixture of ether-petroleum ether added. Shiny black crystals separated that were recovered by filtration (weight 2.5 parts). This latter solid was dissolved in 100 parts of ether, the volume concentrated to about 30 parts, and the solution cooled to give shiny black crystals of diindenyliron that weighed 1.3 parts. The product was purified by recrystallization from ether-petroleum ether. The purified solid, diindenyliron, began to decompose at 125–127° with rapid decomposition at 150–155° C.

*Analysis.*—Calcd. for $C_{18}H_{14}Fe$: C, 75.55; H, 4.93; Fe, 19.52. Found: C, 75.29; H, 5.23; Fe, 19.6.

It will be understood that the above example is merely illustrative and that the invention broadly comprises the production of organometallic compounds in which a group VIII metal is directly bonded to two polycyclic fused ring organic radicals, each of these radicals having a five-carbon carbocyclic ring and two conjugated double bonds in the ring and having bonded to the nuclear carbons at least one fused ring system. Although the indenyl radical is particularly suited for reasons of availability and reactivity, this invention is not limited to this particular radical. Monovalent fused ring radicals derived from other polycyclic compounds which have a five-membered carbocyclic diethylenically unsaturated grouping are likewise useful. Examples of fused ring systems operable in the practice of this invention include indene and fluorene, and their substitution products, e.g., alkoxy substituted indenes.

The diindenyl group VIII metal compounds can be represented by the formula

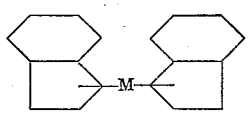

where M is a group VIII metal, preferably a ferrous group metal and most preferably iron.

The difluorenyl group VIII metal compounds can be represented by the formula

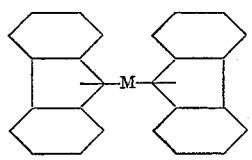

wherein M is a group VIII metal, preferably a ferrous group metal and most preferably iron.

The group VIII metals which are directly bonded to a nuclear or ring carbon of the five-membered carbocyclic ring of the polycyclic fused ring organic radicals as previously described include particularly those of series 4 and 5 of group VIII. These metals include iron, cobalt, nickel, ruthenium, and rhodium. Of these, those that are particularly available and useful are the members of the ferrous group, the fourth series of group VIII, i.e. ferrous group metals of atomic number 26 to 28.

The compounds thus embraced by this invention include those which have a metal of group VIII bonded directly to two separate radicals which have a five-membered carbocyclic ring with two conjugated double bonds and fused through at least one of the double bond positions a further ring system which preferably contains conjugated double bonds. The compounds thus include diindenyliron, diindenyliron tetrachloroferrate, diindenylcobaltic cation, e.g., chloride, diindenylnickel, diindenylruthenium, and the corresponding group VIII metal compounds of 2-ethylindene, 3-phenylindene, 1,3-dimethylindene, 1-methylindene, 3-ethylindene, 4,5-dimethoxyindene, 5,6-dimethoxyindene, 6-ethoxy-5-methoxyindene, and 6-methoxy-2-phenyl-3-methylindene.

The compounds of this invention are generally obtained by the reaction under anhydrous conditions of a group VIII metal halide with an organomagnesium halide wherein the organic radical is that of the fused ring compound previously described. When an organomagnesium compound is employed in this fashion, it is preferred that any substituents on the nuclear carbons should be inert to the Grignard reagent, e.g., hydrocarbon or alkoxyl groups. The Grignard reagent, e.g., indenylmagnesium halide, and specifically the chloride, bromide or iodide, is reacted with the group VIII metal halide, including ferric chloride, ferrous chloride, ferric iodide, cobaltic chloride and nickel chloride, preferably under anhydrous conditions. The reaction is generally effected at a temperature of 0 to 150° C. in the presence of an inert diluent such as an ether or hydrocarbon.

In addition to reaction of the Grignard reagent of the fused ring compounds as heretofore described with the metal halides, the Grignard reagent can be reacted with metal chelates such as cobalt (III) acetylacetonate or ruthenium (III) acetylacetonate. Furthermore, indenyliron compounds can be prepared by the reaction of indene with iron pentacarbonyl at temperatures of preferably above 250° C. The iron compound of the fused ring compounds can also be obtained by passing the inert fused ring compound over pyrophoric ferrous oxide at temperatures of the order of 300–450° C. A further method involves the reaction of a fused ring alkali-metal compound such as indenylsodium with a group VIII metal halide, e.g., iron or nickel chlorides in an inert medium.

The compounds of this invention are useful in catalytic applications such as, for example, in reaction of organic compounds with carbon monoxide. They are also useful as anti-knock agents in fuels for spark ignition engines.

As many apparently widely different embodiments of this invention may be made without departing from the spirit and scope thereof, it is to be understood that this invention is not limited to the specific embodiments thereof except as defined in the appended claim.

We claim:

A polycyclic fused ring ferrous group metal compound selected from the group consisting of difluorenyliron, difluorenylcobalt, difluorenylnickel, and hydrocarbon and alkoxy ring-substituted derivatives thereof, said hydrocarbon substituents containing no more than six carbon atoms and said alkoxy substituents containing no more than two carbon atoms.

References Cited in the file of this patent

UNITED STATES PATENTS

| | | |
|---|---|---|
| 2,356,476 | Shappirio | Aug. 22, 1944 |
| 2,680,756 | Pauson | June 8, 1954 |
| 2,683,157 | Weinmayr | July 6, 1954 |
| 2,694,721 | Weinmayr | Nov. 16, 1954 |
| 2,769,828 | Sieg | Nov. 6, 1956 |

OTHER REFERENCES

Thiele: Ber., vol. 34 (1901) pages 68–69.

Krause et al.: Die Chemie der-metall-organischen Verbindungen (1937), pages 43, 92, Edwards Bros. Inc., Ann Arbor, Michigan, 1943.

Keally et al.: Nature, vol. 168, pages 1039–40, December 15, 1951.